United States Patent
Dent

(10) Patent No.: US 7,940,246 B2
(45) Date of Patent: May 10, 2011

(54) SCREEN CONTROL SYSTEM

(75) Inventor: Jyh-Ren Dent, Jhonghe (TW)

(73) Assignee: Quanta Computer Inc., Tao Yuan Shien (TW)

(*) Notice: Subject to any disclaimer, the term of this patent is extended or adjusted under 35 U.S.C. 154(b) by 1216 days.

(21) Appl. No.: 11/595,696

(22) Filed: Nov. 10, 2006

(65) Prior Publication Data

US 2007/0242075 A1    Oct. 18, 2007

(30) Foreign Application Priority Data

Mar. 22, 2006    (TW) ............................... 95109749 A

(51) Int. Cl.
    *G09G 5/00*    (2006.01)
(52) U.S. Cl. ........................................ 345/156; 345/179
(58) Field of Classification Search ............... 345/156, 345/179
    See application file for complete search history.

(56) References Cited

U.S. PATENT DOCUMENTS

| 6,982,699 B1 | 1/2006 | Lenssen et al. | |
| 2005/0083316 A1* | 4/2005 | Brian et al. | 345/179 |

FOREIGN PATENT DOCUMENTS

| CN | 1047451 C | 11/1994 |
| TW | 1236629 | 5/2003 |

* cited by examiner

*Primary Examiner* — Richard Hjerpe
*Assistant Examiner* — Leonid Shapiro
(74) *Attorney, Agent, or Firm* — Thomas, Kayden, Horstemeyer & Risley, LLP

(57) ABSTRACT

The invention discloses a screen control system including a panel, a magnetic member, at least three magnetic inductive (MI) sensors, and a processing unit. The magnetic member is used for indicating a specific position on the panel. Each of the MI sensors is located under the panel and used for sensing magnetic field of the magnetic member corresponding to the specific position. Afterward, each MI sensor will convert the sensed magnetic field into an output voltage correspondingly. The processing unit is coupled to each of the MI sensors and the panel. According to all of the output voltages, the processing unit will calculate a coordinate corresponding to the specific position. Accordingly, the screen control system is capable of displaying the specific position indicated by the magnetic member for the user.

9 Claims, 4 Drawing Sheets

SCREEN CONTROL SYSTEM

BACKGROUND OF THE INVENTION

1. Field of the Invention

The invention relates to a screen control system and, more particularly, to a screen control system utilizing a plurality of magnetic inductive (MI) sensors to sense a specific position thereon.

2. Description of the Prior Art

Various types of touch screen monitors have been developed to facilitate user interaction with graphical user interfaces (GUIs). Touch screens are gaining popularity for numerous applications, including point-of-information kiosks, vending machines, electronic catalogs, in-store locators, corporate training, gaming, lottery, entertainment, multimedia marketing, banking/financial transactions, ticket sales, interactive education, multimedia demos, museum displays, and the like. A touch screen generally employs one of two types of touch technologies: capacitive and resistive. In general, capacitive and resistive touch technologies both rely on overlays.

By way of illustration, an analog resistive screen is formed of a sandwich of Mylar and plastic or glass separated by substantially transparent elastic spacers. The inside surfaces of the sandwich are coated with a uniform transparent thin film, such as a conductive coating. In operation, a voltage is alternately applied along horizontal and vertical axes of the screen. When a user depresses the Mylar overlay so that its conductive layer contacts the energized layer, the resulting voltage is sensed and transmitted to a controller that converts the signal to an indication of touch location.

In a capacitive type of touch screen, a glass panel is coated with a conductive coating that is fused into the glass. The coating is connected to electrodes located at the edges of the screen. Each electrode is connected to an oscillator circuit. When a user touches the screen, the body capacitance of the user causes a change in the impedance of the screen. The impedance change causes the oscillator frequencies to vary, and the frequency differentials are converted into a corresponding X-Y coordinate.

However, the aforesaid touch screens always have a glass substrate on the LCD panel, such that brightness outputted by the LCD will be reduced. Therefore, the scope of the invention is to provide a screen control system without glass substrate to solve the aforementioned problems.

SUMMARY OF THE INVENTION

A scope of the invention is to provide a screen control system utilizing a plurality of magnetic inductive (MI) sensors to sense a specific position thereon. Accordingly, glass substrate can be removed from the panel of the screen, such that brightness outputted by the panel can be maintained well.

According to a preferred embodiment, the screen control system of the invention comprises a panel, a magnetic member, at least three MI sensors, and a processing unit. The magnetic member is used for indicating a specific position on the panel. The MI sensors are located under the panel, and each of the MI sensors is used for sensing the magnetic field of the magnetic member corresponding to the specific position and then converting the sensed magnetic field into an output voltage correspondingly. The processing unit is coupled to each of the MI sensors and the panel and used for calculating a coordinate corresponding to the specific position according to all of the output voltages. Accordingly, the screen control system is capable of displaying the specific position indicated by the magnetic member for a user.

Therefore, since the screen control system of the invention utilizes the MI sensors to sense the specific position instead of installing a glass substrate above the panel for users to press, the brightness outputted by the panel can be maintained well.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
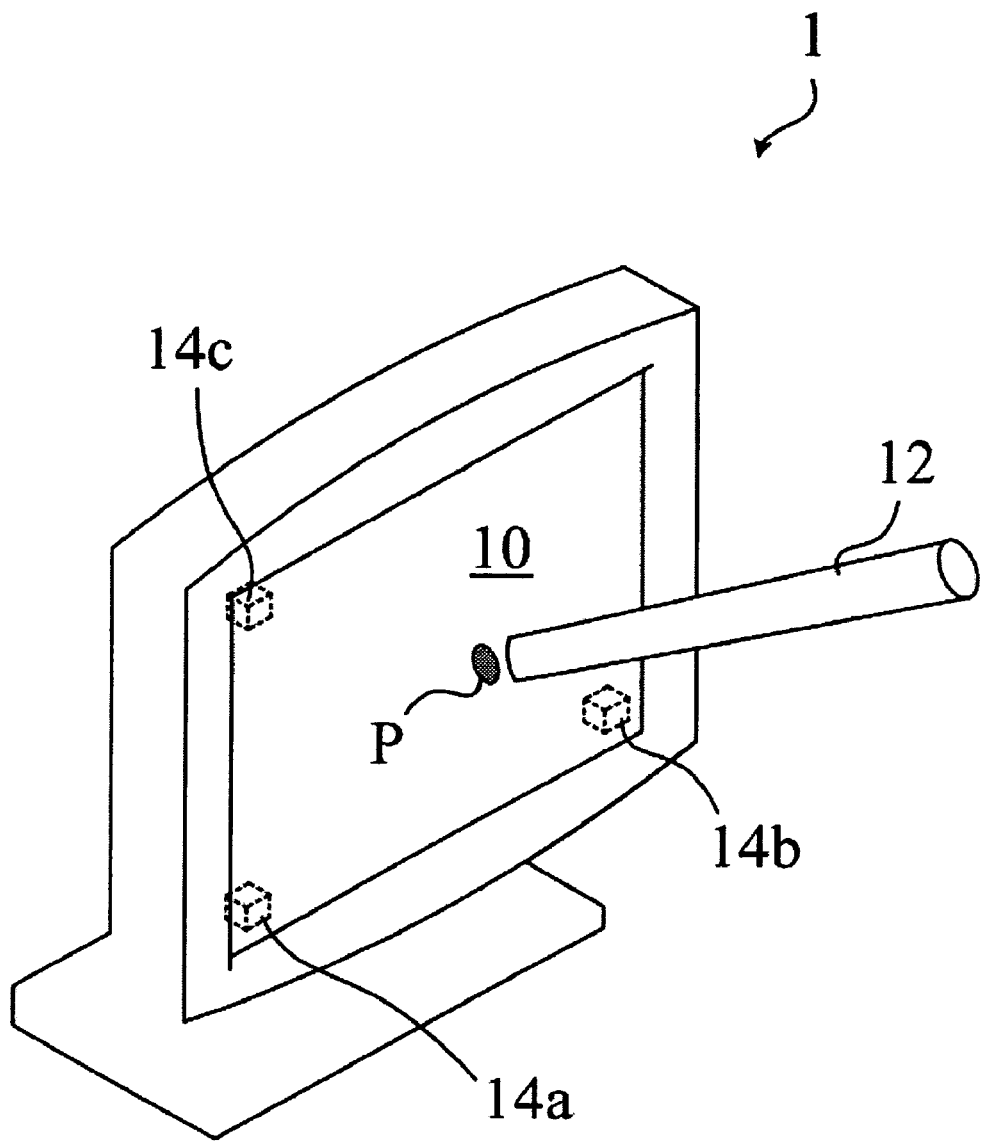
FIG. 1 is a perspective view illustrating a screen control system according to a preferred embodiment of the invention.
Figure 2:
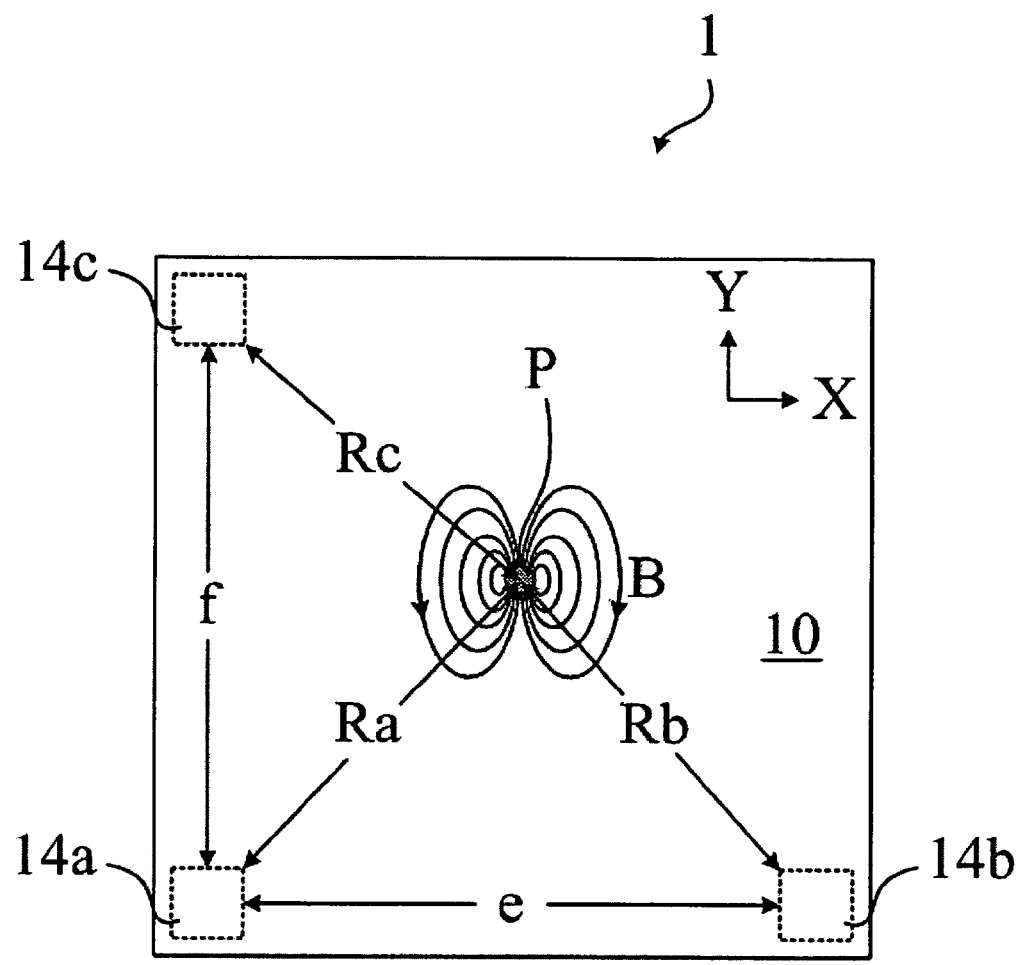
FIG. 2 is a frontal view illustrating a panel shown in FIG. 1.
Figure 3:
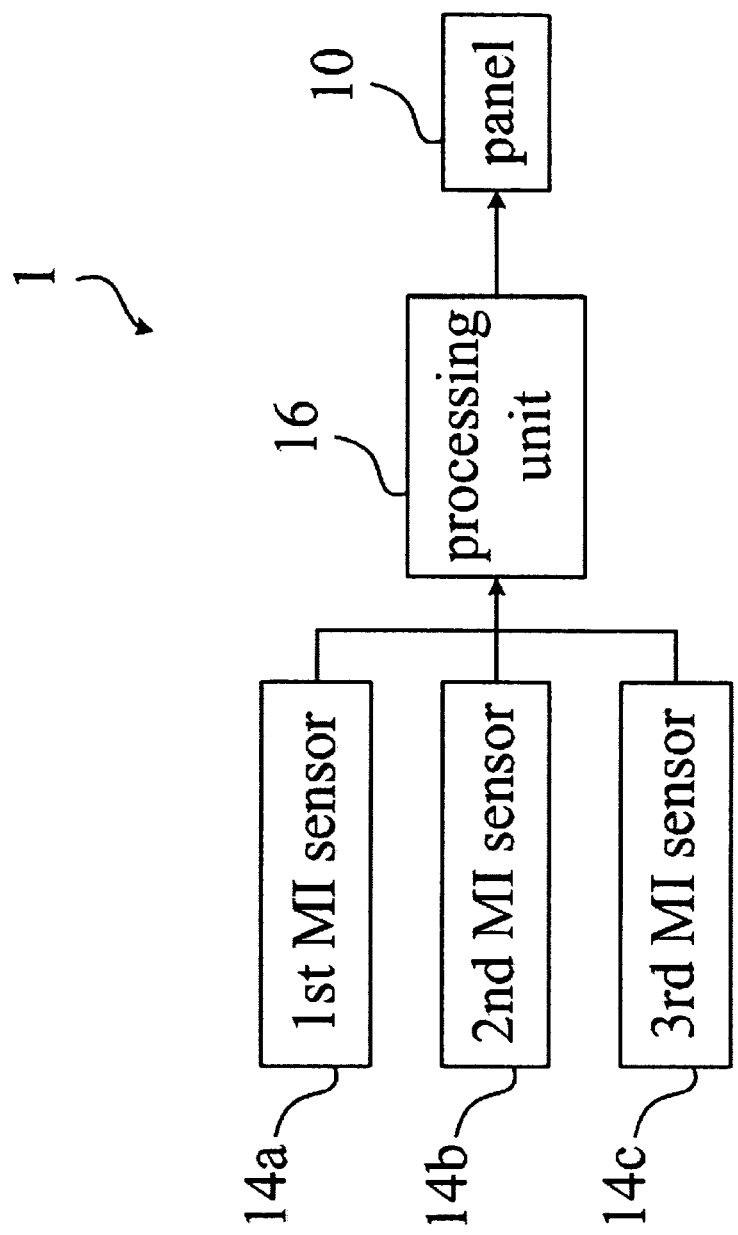
FIG. 3 is a functional block diagram illustrating the screen control system shown in FIG. 1.

Referring to FIGS. 1 through 3, FIG. 1 is a perspective view illustrating a screen control system 1 according to a preferred embodiment of the invention; FIG. 2 is a frontal view illustrating a panel 10 shown in FIG. 1, and FIG. 3 is a functional block diagram illustrating the screen control system 1 shown in FIG. 1. The screen control system 1 comprises a panel 10, a magnetic member 12, at least three MI sensors, and a processing unit 16. The MI sensors comprises a first MI sensor 14a, a second MI sensor 14b, and a third MI sensor 14c respectively located at different corners under the panel 10, as shown in FIGS. 1 and 2.

In this embodiment, the first MI sensor 14a is defined as the origin of the coordinates; the distance from the second MI sensor 14b to the first MI sensor 14a is defined as e, and the distance from the third MI sensor 14c to the first MI sensor 14a is defined as f. It should be noted that the screen control system 1 may also install more than three MI sensors to sense the position more accurately. Each of the MI sensors 14a, 14b, and 14c is a two-axis MI sensor.

As shown in FIG. 3, the processing unit 16 is coupled to each of the MI sensors 14a, 14b, 14c and the panel 10.

In this embodiment, the magnetic member 12 can be a magnet or the like, and the panel 10 can be an LCD panel or the like. Preferably, the magnetic member 12 can be installed within a pen for a user to make good use.

As shown in FIG. 1, the user may take the magnetic member 12 close to the top part of the panel 10 to indicate a specific position P. In this embodiment, the distance from the specific position P to the first MI sensor 14a is defined as Ra; the distance from the specific position P to the second MI sensor 14b is defined as Rb, and the distance from the specific position P to the third MI sensor 14c is defined as Rc, as shown in FIG. 2.

Next, each of the MI sensors 14a, 14b, and 14c senses a magnetic field B while the magnetic member 12 is at the specific position P and then converts the sensed magnetic field B into an output voltage. In this embodiment, the output voltage outputted by the first MI sensor 14a is defined as Va; the output voltage outputted by the second MI sensor 14b is defined as Vb, and the output voltage outputted by the third MI sensor 14c is defined as Vc.

Afterward, according to the output voltages Va, Vb, and Vc, the processing unit 16 calculates the coordinate (X, Y) of the specific position P using the following equations by an iteration method.

Equation 1:

$$\begin{cases} Ra - Rb = \sqrt[3]{\dfrac{\alpha}{Va - Vb}} & \ldots(A) \\ Rb - Rc = \sqrt[3]{\dfrac{\alpha}{Vb - Vc}} & \ldots(B); \text{ and} \\ Rc - Ra = \sqrt[3]{\dfrac{\alpha}{Vc - Va}} & \ldots(C) \end{cases}$$

Equation 2:

$$\begin{cases} X^2 + Y^2 = Ra^2 & \ldots(D) \\ (X - e)^2 + Y^2 = Rb^2 & \ldots(E) \\ X^2 + (Y - f)^2 = Rc^2 & \ldots(F) \end{cases}$$

In the aforesaid equation 1, equations (A), (B), and (C) are not dependent equations. Furthermore, a may be a predetermined constant or calculated by the following equation.

$$B = \alpha 1/R^3, \qquad \text{Equation 3:}$$

wherein R represents a predetermined distance on the panel 10.

In this embodiment, the processing unit 16 may estimate a value of Ra at the start and will substitute the value of Ra into equation (A) to calculate a value of Rb. Afterward, the processing unit 16 substitutes the value of Rb into equation (B) to calculate a value of Rc. Then, the processing unit 16 substitutes the values of Ra, Rb, and Rc into equation 2 respectively to calculate three sets of coordinates (X1, Y1), (X2, Y2), and (X3, Y3). Next, the processing unit 16 averages the coordinates (X1, Y1), (X2, Y2), and (X3, Y3) to obtain an averaged coordinate (Xavg, Yavg) and then calculates a new value of Ra' as $Ra' = \sqrt{X_{avg}^2 + Y_{avg}^2}$. Finally, the processing unit 16 will calculate Rb' and Rc' based on Ra' and repeat the aforesaid calculating process. In the same way, the processing unit 16 can also estimate a value of Rb or Rc at the start to proceed with follow-up calculating process.

In this embodiment, the processing unit 16 will stop the calculating process when (Ra'−Ra) is smaller than 10 mm, (Rb'−Rb) is smaller than 10 mm, and (Rc'−Rc) is smaller than 10 mm. Then, the processing unit 16 will output the coordinate (X, Y) corresponding to the specific position P. Accordingly, the screen control system 1 is capable of displaying the specific position P indicated by the magnetic member 12 for the user.

Figure 4:
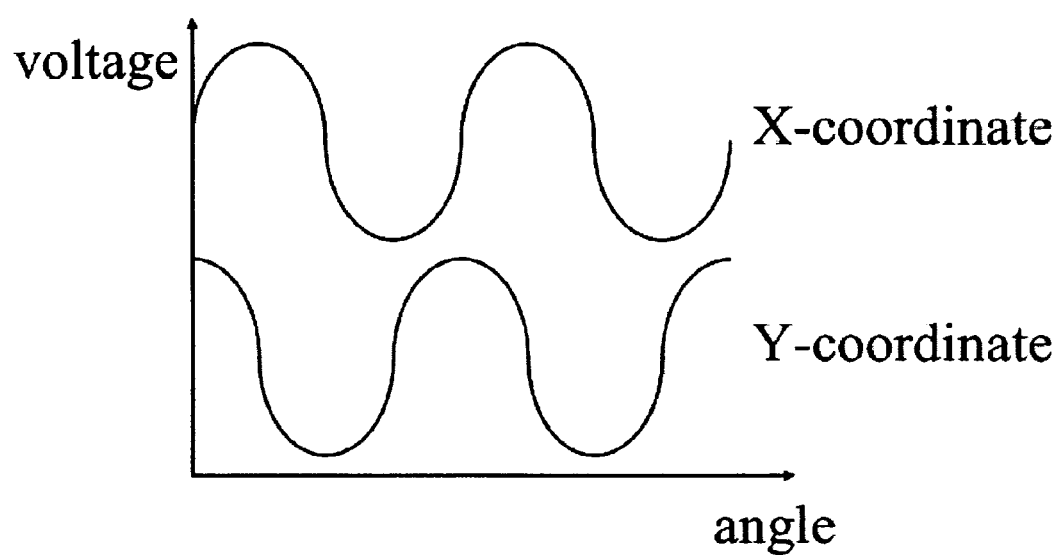
FIG. 4 is a diagram illustrating the relationship between the output voltage and the rotating angle.

Moreover, when the user rotates the magnetic member 12 at the specific position P, the processing unit 16 is capable of detecting the rotating direction (angle) of the magnetic member 12 according to variation of each output voltage outputted by the MI sensor 14a, 14b, or 14c. Referring to FIG. 4, FIG. 4 is a diagram illustrating the relationship between the output voltage and the rotating angle. As shown in FIG. 4, when the user rotates the magnetic member 12, the output voltage (X-axis or Y-axis) of each MI sensor will vary. Accordingly, various functions may be defined for the screen control system 1 based on the rotating direction (angle) of the magnetic member 12, as shown in the following table 1.

TABLE 1

| Rotating direction of the magnetic member 12 | Output voltage X-axis | Y-axis | Function |
|---|---|---|---|
| Fixed | + | + | None |
| Rotate to left | + | − | Left click |
| Rotate to right | − | + | Right click |

In another preferred embodiment, each of the MI sensors 14a, 14b, and 14c can be a three-axis MI sensor.

Compared to the prior art, since the screen control system of the invention utilizes the MI sensors to sense the specific position instead of installing a glass substrate above the panel for users to press, the brightness outputted by the panel can be maintained well. Furthermore, the invention can define various functions (e.g. left or right click) for the screen control system according to the rotating direction (angle) of the magnetic member, so it is more convenient for the user.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A screen control system comprising:

a panel;

a magnetic member for indicating a specific position above the panel;

at least three magnetic inductive (MI) sensors located under the panel, each of the MI sensors being used for sensing a magnetic field of the magnetic member corresponding to the specific position and then converting the sensed magnetic field into an output voltage correspondingly, the MI sensors comprising a first MI sensor, a second MI sensor and a third MI sensor, wherein a distance from the specific position to the first MI sensor is defined as Ra, a distance from the specific position to the second MI sensor is defined as Rb, a distance from the specific position to the third MI sensor is defined as Rc, the output voltage outputted by the first MI sensor is defined as Va, the output voltage outputted by the second MI sensor is defined as Vb, the output voltage outputted by the third MI sensor is defined as Vc, and Ra, Rb, Rc are associated with Va, Vb, Vc by the following equations:

$$Ra - Rb = \sqrt[3]{\dfrac{\alpha}{Va - Vb}};$$

$$Rb - Rc = \sqrt[3]{\dfrac{\alpha}{Vb - Vc}}; \text{ and}$$

$$Rc - Ra = \sqrt[3]{\dfrac{\alpha}{Vc - Va}};$$

wherein α represents a predetermined constant; and a processing unit, coupled to each of the MI sensors and the panel, for calculating a coordinate corresponding to the specific position according to all of the output voltages.

2. The screen control system of claim 1, wherein the first MI sensor, the second MI sensor, and the third MI sensor are respectively located at different corners under the panel.

3. The screen control system of claim 1, wherein the coordinate comprises an X-coordinate and a Y-coordinate, the first MI sensor is defined as the origin of the coordinates, a distance from the second MI sensor to the first MI sensor is defined as e, a distance from the third MI sensor to the first MI sensor is defined as f, and Ra, Rb, Rc, X, Y are associated with e, f by the following equations:

$$X^2+Y^2=Ra^2;$$

$$(X-e)^2+Y^2=Rb^2; \text{ and}$$

$$X^2+(Y-f)^2=Rc^2.$$

4. The screen control system of claim 3, wherein the processing unit calculates the coordinate of the specific position by an iteration method.

5. The screen control system of claim 1, wherein when the magnetic member rotates at the specific position, the processing unit is capable of determining a rotating direction of the magnetic member according to a variance between the output voltages outputted by the MI sensors.

6. The screen control system of claim 1, wherein each of the MI sensors is a two-axis MI sensor respectively.

7. The screen control system of claim 1, wherein each of the MI sensors is a three-axis MI sensor respectively.

8. The screen control system of claim 1, wherein the magnetic member is a magnet.

9. The screen control system of claim 1, wherein the panel is a liquid crystal display (LCD) panel.

* * * * *